UNITED STATES PATENT OFFICE.

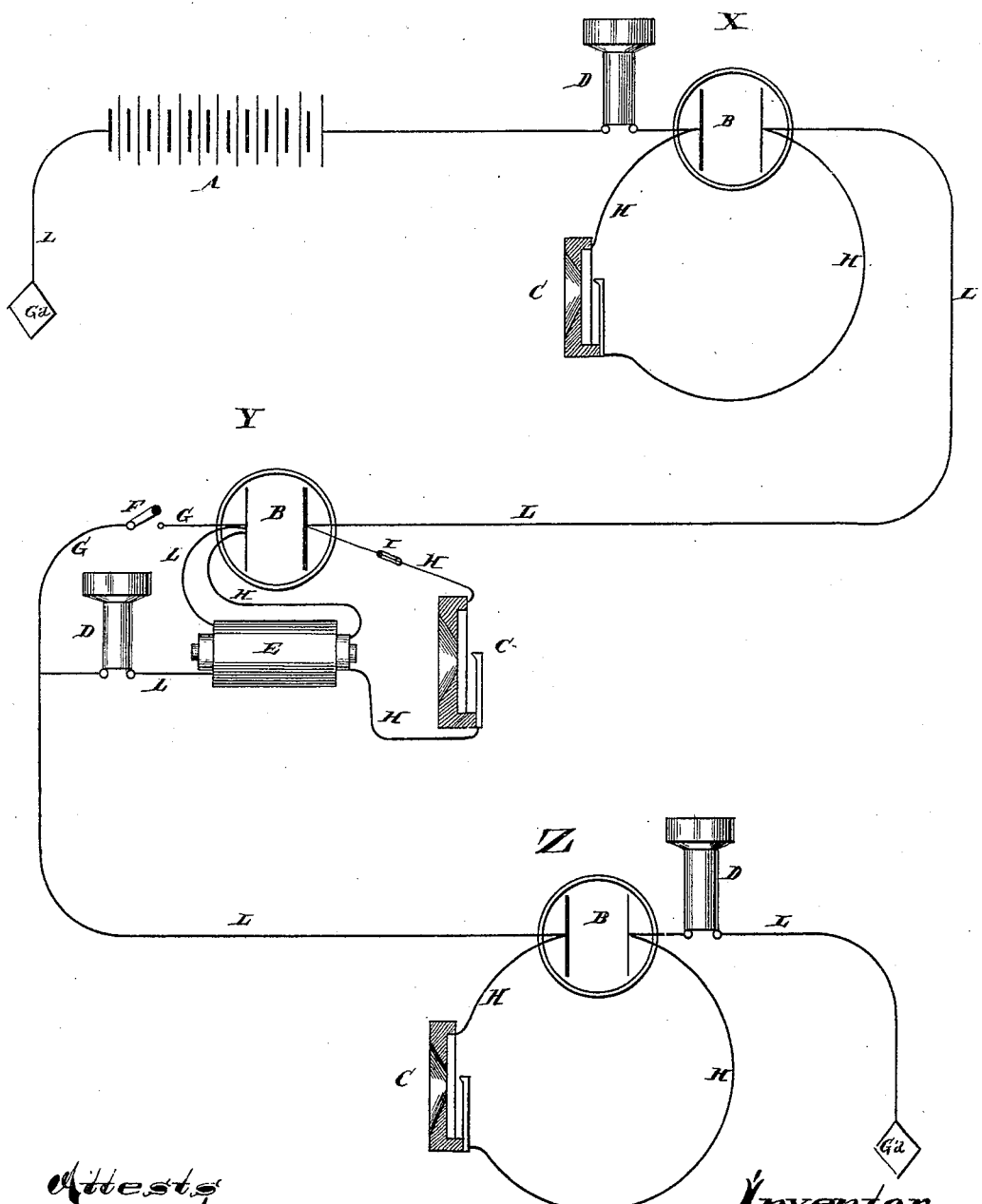

J. MILTON STEARNS, JR., OF BROOKLYN, NEW YORK.

TELEPHONIC CIRCUIT.

SPECIFICATION forming part of Letters Patent No. 270,500, dated January 9, 1883.

Application filed July 9, 1881. (No model.)

*To all whom it may concern:*

Be it known that I, J. MILTON STEARNS, Jr., of the city of Brooklyn, in the county of Kings and State of New York, have invented an Improvement in Telephonic Circuits, of which the following is a specification.

My invention relates to an improved system for telephonic transmissions; and it consists in providing one end of the line with a main or line battery or electric-current generator, and each station on said line with a local secondary battery in circuit with the line and with a transmitter through the agency of a local circuit, either direct or through a primary wire of an induction-coil, the secondary wire of said coil being in circuit with the line and one pole of the secondary battery; further, in providing the line with a switch or key, whereby the line-current may pass from the secondary to the line without passing through the coil of the induction-coil; further, in arranging said main battery and secondary batteries in the same circuit, and said main battery being set to line with its poles in the reverse direction to the poles of the secondary or local batteries.

The object of this invention is to arrange a battery at each local station through which a charging-current is always passing, decomposing the substance or compound designed to play the part of the reagent in the generation of electricity in said local secondary battery when the local circuit is closed; and when said circuit is closed through the agency of the transmitter, the decomposed substance recombines, producing an electrical current which shall modify the continuous line-current, causing it to operate the receiver at a distant station, whereby said local battery will never wear out nor require watching.

In the drawing is shown a plan view of a main line, line-battery, and three local stations, with their apparatus, as constructed and arranged for adaptation to my improved system.

A is the main or line battery, and is located at one end of the line L, with one pole to the ground. The other pole of said battery is connected to the similar pole of the secondary local battery B at station X. The other pole of said battery is connected to the line L. A local circuit, H, connects both poles of said secondary battery through the transmitter C, said circuit always being open, except when the transmitter is being operated. The receiver D is in circuit with the line L, as shown. All of the other stations are similarly arranged, except when an induction-coil is used, in which case some slight modifications are made. Station Y shows an arrangement with an induction-coil, E. In this case the line L is connected to one pole of the local secondary battery through the secondary wire of induction-coil E, and the local circuit H passes through the primary wire of the induction-coil E. I also provide a short wire, G, provided with a switch or cut-out, F, between the line-wire L on one side of the induction-coil E and the battery B, as shown, to cut out said induction apparatus by allowing the current to pass directly over line G to the secondary battery. This is not absolutely necessary, as the current passing through the secondary coil or wire of the induction-coil would not induce a current in the primary wire when the circuit H was open in the transmitter C; but I prefer to use the switch or cut-out. If desired, the local circuit H and entire induction apparatus may be cut out from line L; or the local circuit may be provided with a switch, I, to positively open wire H. Station Z is arranged similarly to station X, with the exception of the main battery A. The local batteries B are what are commonly known as "secondary," and may be made in various ways—as, for instance, two plates of lead immersed in sulphuric acid and water, lead-plate, porous cup containing carbon and nitrate of potash, &c. In the first of these instances the passage of a current through the "battery" (if it might be so called) causes the lead at one pole to become peroxidized, and upon completing a short circuit through said plates a strong current is obtained; and in the second instance the nitrate of potash is decomposed, the nitric acid goes to the porous cup, and the potash remains with the lead, and upon making a short circuit through the carbon and lead a powerful current is obtained.

The operation is as follows: A current, being generated by the main battery A or by a dynamo-electric machine, passes down the line L and through the secondary batteries B, and finally to the ground. This current causes reactions to take place in the secondary, as set forth above, placing said secondary batteries in proper condition to generate powerful currents. If, now, the transmitter C be operated, the local circuit H, through the transmitter and secondary, will be closed, and the effect of the current is transmitted down the line to the receiving-station. When the induction-coil is used, as shown at station Y, the switch I is closed and switch F is opened. Now, upon using the transmitter C, the secondary cell will be short-circuited through the transmitter and primary wire, the induction-coil E, and operates as a local battery. It is long-circuited through the line L and line-battery A; but no current passes that way because the line-battery must have a higher electro-motive force than the local secondary battery.

This form of apparatus is particularly good on open-circuit telephone-lines, where two or more subscribers are on one line or wire, for there is no care necessary in maintaining at each station a local battery, which, from inattention, is liable to run down. This combination of the secondary cell with a local circuit and line with its main battery or electric generator may be also used for telegraphic purposes.

Having now described my invention, what I claim as new, and desire to secure by Letters Patent, is—

A line-wire provided at one end with a line-battery or electric-current generator, in combination with a secondary cell arranged upon said line, and adapted to store up electricity upon the passage of the main-line current through it, a local circuit in circuit with said secondary cell, and a transmitter in said local circuit, substantially as and for the purpose specified.

In testimony of which invention I hereunto set my hand.

J. MILTON STEARNS, JR.

Witnesses:
  JOHN M. STEARNS,
  E. A. SCHOETTEL.